United States Patent Office 3,443,069
Patented May 6, 1969

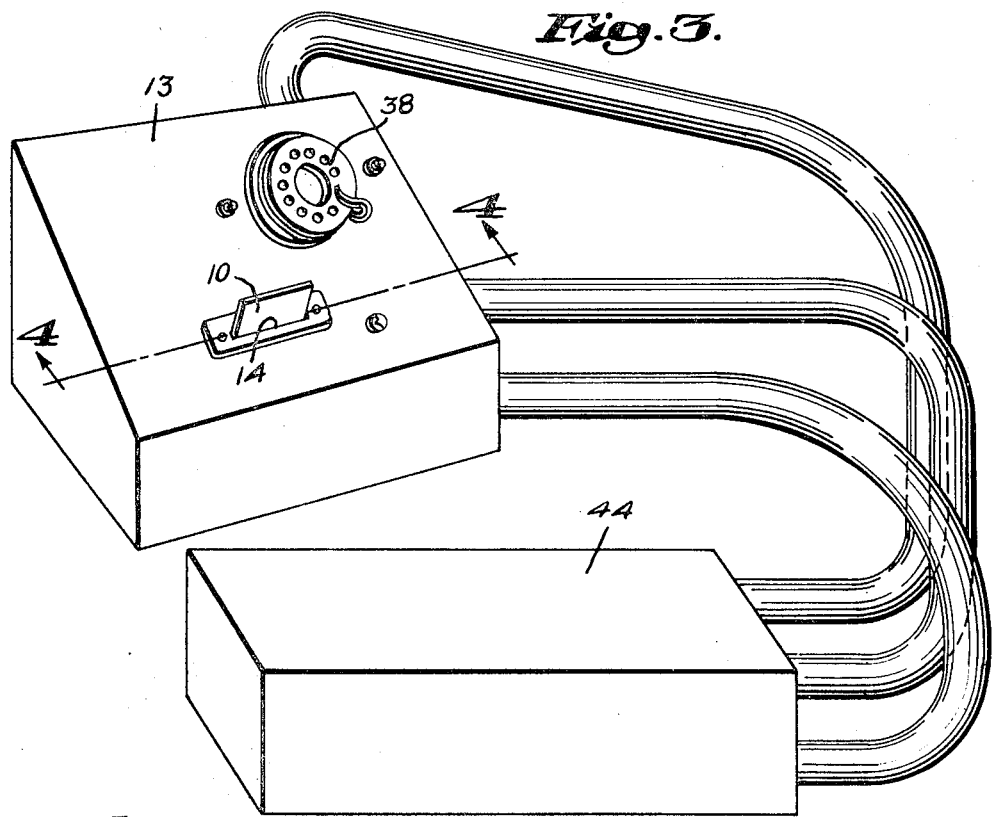
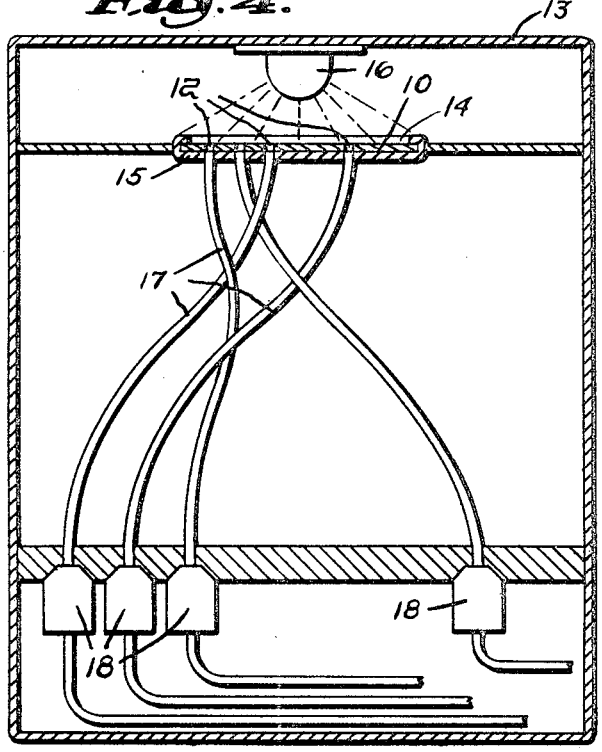
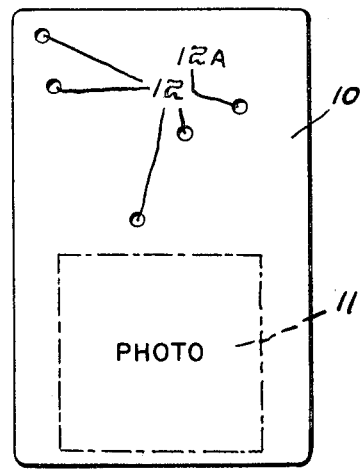

3,443,069
SECURITY SYSTEMS
Warren A. Bjorn, 349 Linden St.,
Wellesley Hills, Mass. 02181
Filed Jan. 22, 1965, Ser. No. 427,391
Int. Cl. G06k 7/00; H04q
U.S. Cl. 235—61.11                                5 Claims

ABSTRACT OF THE DISCLOSURE

Controls for a security system requiring a card having translucent areas representing a particular code number are disclosed as including circuits closed by light admitted through the translucent areas. Each circuit has parallel leads and these are connected to control and operating leads by manually operable switch means, the control leads including means which when energized maintain the operating leads open unless the switch means is manually set to connect one lead of a light energizer circuit to the operating lead and disconnect the other lead of that circuit from the control lead.

---

Figure 1:
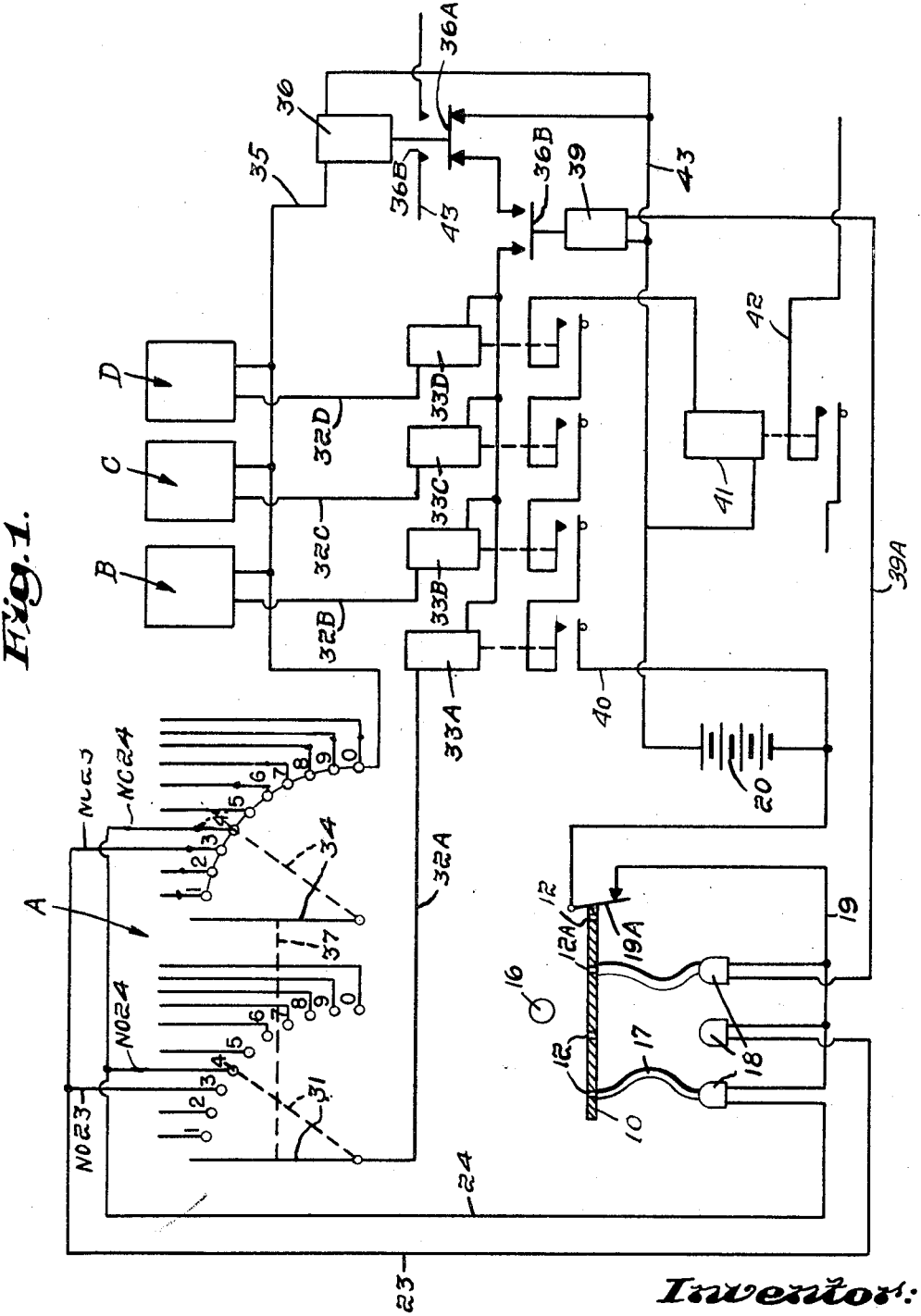

The present invention relates to security systems each for use with and operated by a coded card in conjunction with manually operated switch means that must be set in a manner representing the appropriate code number.

Identification cards are an essential part of security systems of various types and are objectionable in that they may be lost or stolen and used by an unauthorized person to gain access to a classified area.

The principal objective of the present invention is to provide a system in which an identification card cannot be used unless the person in possession of the card knows the identification number and imparts that information into the card reader.

In accordance with the invention, this objective is attained by providing opaque identification cards each having a series of randomly arranged translucent areas representing a particular code number. The system has a series of circuits for each digit of the code number with each circuit including a light responsive switch. A card receiver has a light source and a plurality of light channels, each for effecting light transmission to an appropriate one of the light responsive switches. Certain of the channels are blocked by the card in the receiver and certain of the channels are open through its translucent areas. The circuits of each series are controlled by manually operated switch means operable to close a circuit selected to represent the appropriate number of a digit of the code number of the card in the receiver. Security standards are met if the circuits controlled by the manually operated switch means are the same as those closed by the transmission of light through the translucent areas of the card in the receiver.

Another principal objective of the invention is to have each circuit of each series thereof include first and second parallel leads with the switch means in control of both sets of leads and normally open with respect to the first series leads and normally closed with respect to the second series leads and operable to close a first series lead selected to represent the appropriate number of a digit of the code number of the card in the receiver and to open the corresponding second lead. If a security standard is met, a first lead of each series of circuits is closed while if the correct number is not supplied by the card user, a second series lead of at least one series of circuits will be closed.

Another objective of the invention is to incorporate appropriate security devices into the system. In simple systems, such a device may be simply a green light placed in circuit if standards are met or a red light that is placed in circuit if such standards are not met. More sophisticated systems may include locking and unlocking controls and more extensive alarms.

In the accompanying drawings, there is shown an illustrative embodiment of the invention from which these and other of its objectives, novel features, and advantages will be apparent.

Figure 2:
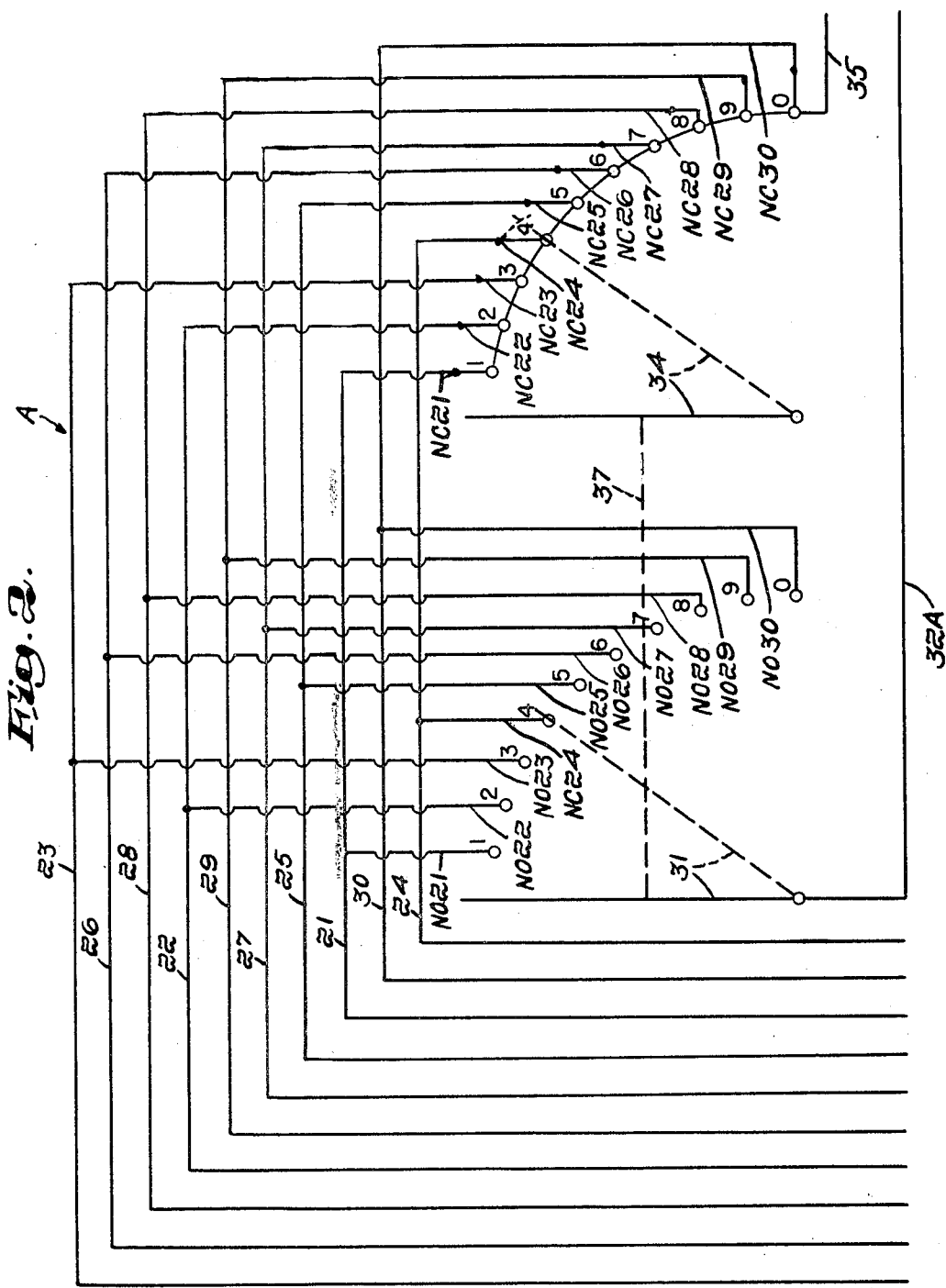

In the drawings:

FIGURE 1 is a partly schematic and partly diagrammatic view of a security system in accordance with the invention, FIGURE 2 is a like view illustrating one of the series of circuits in greater detail, FIGURE 3 is a perspective view illustrating the equipment, FIGURE 4 is a section illustrating the card receiver along the generally indicated lines 4—4 of FIGURE 3, and FIGURE 5 is a face view of a card.

In accordance with the invention, each security system is for use with a series of identification cards such as the card 10. Desirably, but not necessarily, the card 10 has a space 11 for the photograph of the bearer. Each card is opaque and has a series of translucent areas 12, conveniently apertured, representing the code number of that particular card. It is preferred that each card 10 also have one such translucent area 12A representing a control or key number for the entire series of cards.

The series of translucent areas are randomly arranged so that the code number cannot be determined by the visual inspection of a card. The areas may be arranged in regular or irregular geometric patterns and randomly numbered or the areas may be randomly arranged and randomly numbered.

A receiver 13 is provided with a card receiving slot 14 enabling a card 10 to be placed in a predetermined position on a support 15 relative to a light source 16. The receiver 13 is provided with a plurality of tubular, light receiving and transmitting channels 17, one for each translucent area 12 of any and all of the cards 10 for use with the particular security system. Each channel 17, unless blocked by an opaque portion of a card 10, effects transmission of light from the light source 16 to an appropriate one of the light responsive switches 18, each being indicated as of the normally open type and in control of an appropriate one of the operating circuits which are arranged in series of ten, one series for each digit of the code number. The channels 17 are scrambled, each being preferably flexible, of the type manufactured by the American Optical Company, for example. By this arrangement, the relationship of either end of the channels 17 or of the switches 18 is meaningless without knowledge of the code system.

The operating circuits are connected in parallel to a lead 19 from the battery 20 and the lead 19 has a normally open switch 19A closed when a card 10 is in a predetermined position in the receiver 13.

In the security system shown in the drawings, the code number consists of four digits and these are, accordingly, four series of circuits indicated generally at A, B, C, and D. The series B, C, D are shown simply as blocks to simplify the drawings. As previously stated, each series of circuits has ten circuits indicated by the reference numerals 21–30 representing the numbers 1–10. Each such circuit includes a first series of leads indicated by the prefix addition N.O. to the appropriate circuit-indicating reference numerals and a parallel series of leads indicated by the prefix addition N.C. to the corresponding circuit-indicating reference numerals.

Each lead of the first series has a switch contact indicated by the numbers it represents and adapted to be engaged by the switch arm 31 by which every one of the contacts may be connected by a lead to a relay, the relay leads for the series of circuits A, B, C, and D being indicated at 32A, 32B, 32C, and 32D, respectively, and the relays being indicated at 33A, 33B, 33C, and 33D, respectively.

Each lead of the second series has a switch contact indicated by the number it represents and is of the normally closed type adapted to be open by the engagement therewith of the switch arm 34. The contacts of the second series of leads of each series of circuits have a common lead 35 including a relay 36 and the battery 20.

In FIGURES 1 and 2, the switch arms 31 and 34 are indicated at 37 as being interconnected and manually operable, for example, by conventional dial systems, the dial of which is indicated at 38 in FIGURE 3, with the switch arm 31 closing a particular lead of the normally open series thereof. By this arrangement, if the appropriate number of the first digit of the code number is four (4), the appropriate light responsive switch 18 is energized by the passage of light through the appropriate translucent area thereof. If, for example, the holder of the card 10 in the receiver 13 now sets the switch arm 31 to the number "4," the corresponding lead 32A of the normally open series is closed thereby to energize the coil of the relay 33A. Simultaneously, the corresponding normally closed lead is opened so that the relay 36 is not energized.

If, however, the holder of the card 10 had set the switch arm to the number "3," the lead 32A to the relay 33A would not be closed and the normally closed lead to the relay 36 would not be opened.

At this point, it should be pointed out that the circuits of each series are preferably scrambled. In addition all such circuits are controlled by a normally open relay 39 in a lead 39A controlled by the one of the switches 18 that is energized when light passes through the control or key translucent area 12A so that only codes of the appropriate control or key numbers may be used. When the lead 39A is closed, the relay 39 is energized, the circuit through the lead 32A may be completed as the correct type of card has been inserted in the holder.

From the foregoing, it will be apparent that, with a card of the correct key number, either the first or the second lead of any series of circuits will be energized depending on whether the normally operable switch control means effects the closing of the same circuits as those closed by the passage of light through the code area 12.

If the closed circuits are matched for all digits of the remembered identification number in the operation of the manually operated switch control means, the relays 32A, 32B, 32C, and 32D will all be energized and each is shown as contributing a lead 40 from the battery 20 to a relay 41 which, when energized, closes a circuit 42 to a device indicating that a security standard has been met. Such a device may be a green light or a door opening mechanism, for example.

If, however, the setting of the manually operated switch means for any of the series of circuits does not match the circuit control resulting from the insertion of a properly sized card 10, the appropriate one or ones of the relays 32A, 32B, 32C, and 32D are not energized and the relay 36 is energized.

The relay 36 has a position in which the switch 36A is normally closed. When the relay 36 is energized, the switch 36B is closed in the circuit 43, the circuit 43 including a device indicating the failure to satisfy a security standard. Such a device may be a red light or other alarm.

In practice, the dialing system is within the receiver 13 and its dial 38 mounted thereon. The various relays, the battery and device operating circuits are within a housing 44.

From the foregoing, it will be apparent that security systems in accordance with the invention are well adapted to function reliably to meet a wide range of operating requirements and conditions.

I claim:

1. In a control for a security system requiring a card having a series of translucent areas representing a particular code number, said control comprising a series of circuits for each digit of the code number, each circuit including a light responsive switch, a card receiver including a light source for effecting light transmission from said source to an appropriate one of said switches, certain of said switches being blocked from the light source by the card in the receiver and certain of said channels being exposed thereto through said areas, each circuit of each series of circuits also including first and second parallel leads, an operating lead, a control lead, and manually operated switch means for both leads of each circuit of each series of circuits, said switch means being normally open with respect to the first leads and closed with respect to the second leads and operable to connect a first lead that is selected to represent the appropriate digit of the code number of the card in the receiver to the operating lead and at the same time disconnect the corresponding second lead from the control lead, the operating lead including a normally closed switch and the control lead including control means which when energized opens said normally closed switch thereby to ensure the meeting of the security standard that the operating lead remains open unless the circuits controlled by the translucent areas are the same as those controlled by the manually operated switch means.

2. The control of claim 1 and a circuit for use when the safety standard has not been met and including a normally open switch closed by the control means.

3. The control of claim 2 in which the control means is common to the several series of circuits.

4. The control of claim 1 and a circuit including a device for use when the safety standard has been met and a series of normally open switches, one for each series of circuits, and the operating lead of each series includes means operable when energized to close an appropriate one of the normally open switches in the circuit to the device.

5. The control of claim 1 and an additional circuit for use where the card has an additional translucent area that is a code for a series of cards, the additional circuit including a light responsive switch arranged to be actuated by the light source unless the light is blocked therefrom by the card, the operating circuit including a normally open switch, and the additional circuit includes means which, when energized, closes the last named switch.

References Cited

UNITED STATES PATENTS

| | | | |
|---|---|---|---|
| 2,714,201 | 7/1955 | Whitehead | 340—149 |
| 2,817,824 | 12/1957 | Albright | 340—149 |
| 3,015,087 | 12/1961 | O'Gorman | 340—149 |
| 3,315,082 | 4/1967 | Milroy | 250—227 |

MAYNARD R. WILBUR, *Primary Examiner.*

T. J. SLOYAN, *Assistant Examiner.*

U.S. Cl. X.R.

340—149